March 12, 1940.  D. L. WOOD  2,193,016
VIEWING DEVICE
Filed April 16, 1938  2 Sheets-Sheet 1

Donald L. Wood
INVENTOR
BY
ATTORNEYS

March 12, 1940. D. L. WOOD 2,193,016
VIEWING DEVICE
Filed April 16, 1938 2 Sheets-Sheet 2

Donald L. Wood
INVENTOR

BY
ATTORNEYS

Patented Mar. 12, 1940

2,193,016

UNITED STATES PATENT OFFICE 2,193,016

VIEWING DEVICE

Donald L. Wood, Rochester, N. Y., assignor to Eastman Kodak Company, Rochester, N. Y., a corporation of New Jersey Application April 16, 1938, Serial No. 202,488

4 Claims. (Cl. 88—16)

The present invention relates to a viewing device and more particularly to a viewing device which may be inserted into the magazine chamber of a photographic apparatus for finding and/or focusing through the objective of the apparatus.

It is quite necessary in certain types of photographic work to obtain maximum sharpness of the image in the focal plane of the objective.
Such sharpness of focus may be obtained by accurate measurement of the distance between the photographic objective and the object and then setting the objective focus according to its calibrated scale. However, such method is very inconvenient and introduces many possible errors, all of which may be avoided by direct viewing and focusing through the objective itself.

The primary object of the present invention is the provision of a viewing device mounted upon a base which may be inserted into the magazine chamber of the apparatus and which includes an optical system brought into operative relation to the photographic objective when the device is so inserted.
Another object of the invention is the provision of a viewing device including an optical system and a ground glass screen therein and also including a base member for supporting said optical system within the magazine chamber of the apparatus and in operative relation to the photographic objective with said ground glass surface in the focal plane of the objective.

Another object of the invention is the provision of a viewing device comprising a base member having an abutment for engaging and blocking an operating mechanism of the photographic apparatus to stop the shutter thereof in open position.

Other objects of the invention will be apparent to those skilled in the art from the disclosure which follows.

The above and other objects of the invention are realized in a viewing device having a base member arranged to correspond to or simulate the outline of a film magazine, including an optical system mounted on said base member and having a ground glass focusing surface which is brought into the focal plane of the objective when the viewing device is inserted into the magazine chamber of the apparatus. Said base member also has locating surfaces for engaging the locating members in the apparatus, which normally support the film magazine in proper position, and has an abutment located to engage and block the film advancing mechanism of the apparatus with the shutter member thereof in open position. Finally, the viewing device includes a releasing member for disengaging interlocking mechanism of the apparatus for its abnormal operation.

Reference is hereby made to the accompanying drawings, wherein similar reference characters designate similar elements and wherein.

Figure 1:
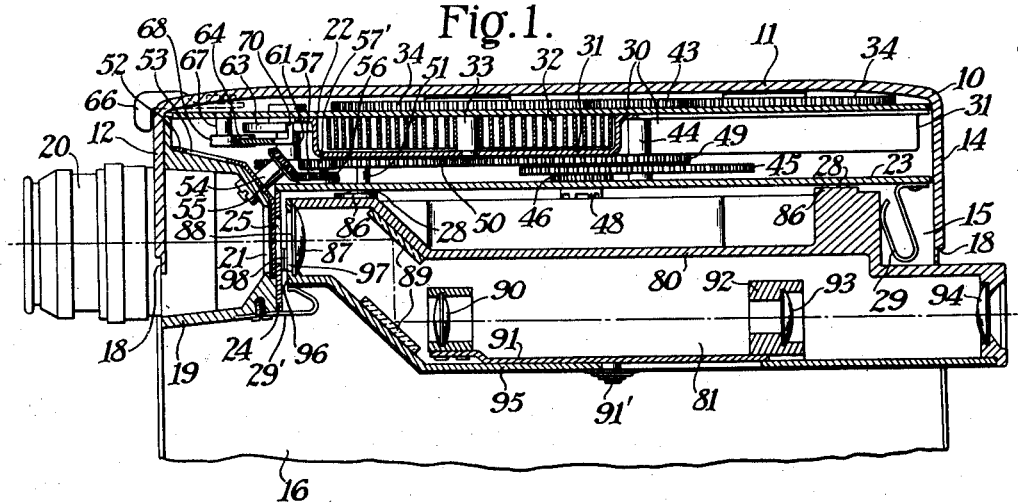
Fig. 1 is a transverse cross section through a photographic apparatus and the viewing device inserted therein.

The present invention is to be explained in connection with a standard motion picture apparatus of the magazine type but it is to be understood that the viewing device of the invention may also be applied to the other forms of photographic apparatus of the magazine type.

The photographic apparatus or motion picture camera of the illustrated embodiment is enclosed within a casing 10 having a side wall 11, a front lateral wall 12, a top lateral wall 13, a rear lateral wall 14 and a bottom lateral wall 15 to which a flanged cover 16 is connected by hinges 17, said lateral walls 12, 13, 14 and 15 being provided with an undercut recess 18 for light-sealing engagement with the flange of cover 16.

An objective socket 19 is mounted within casing 10 adjacent front lateral wall 12 and receives and supports the objective assembly or photographic objective 20. Said objective socket 19 is provided in the rear end thereof with an exposure aperture 21.

Figure 2:
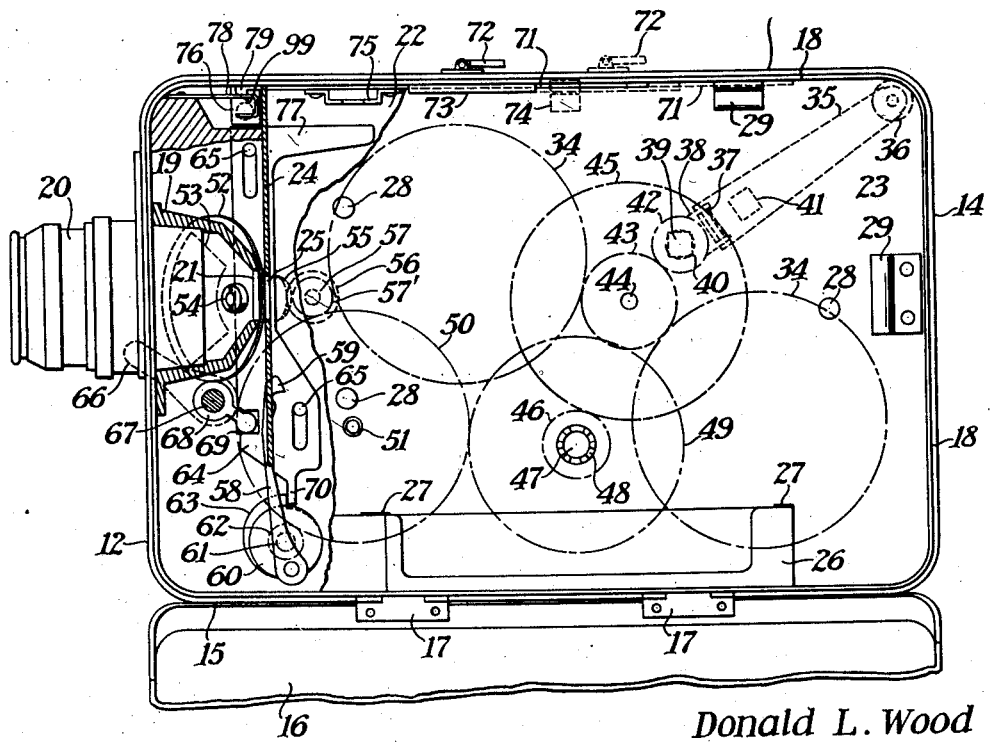
Fig. 2 is a side elevation of the photographic apparatus showing the conventional elements thereof with which the viewing device of the invention co-operates.

A main mechanism plate 22 is mounted within casing 10 adjacent but in spaced relation to side wall 11. A cover plate 23 is mounted in parallel spaced relation to the main mechanism plate 22 and forms one side of the magazine chamber within the apparatus. A front plate 24, see Figs. 1 and 2, is mounted perpendicularly to cover plate 23 to form the front wall of the magazine chamber and is provided with an exposure aperture 25 in registration with the exposure aperture 21 in the objective socket 19. A supporting block 26 is mounted along the bottom lateral wall 15 and includes locating members 27 for engaging and positioning the film magazine within the magazine chamber. The cover plate 23 has a plurality of integral bosses 28 and carries a pair of springs 29. A spring 29' is mounted on the objective socket 19 and acts in conjunction with the other springs and locating members accurately to position the film magazine when it is inserted into the magazine chamber. The magazine chamber is defined by cover plate 23, flanged cover 16, front plate 24, a portion of top lateral wall 13, a portion of rear lateral wall 14 and supporting block 26.

The operating mechanism of the photographic apparatus will next be described and includes a prime mover, a shutter member, film advancing mechanism, and interconnecting gear trains. The prime mover is preferably provided as a pair of spring motors 30, each motor comprising a casing 31 fastened to the main mechanism plate 22 and containing a coil spring 32 which has its outer end attached to casing 31 and its inner end attached to an arbor 33. Said arbor 33 extends through mechanism plate 22 and carries a pinion gear 34. Said spring members 30 may be wound in conventional manner such as by a crank 35 having a handle 36 and connected by a hinge 37 to a collar 38 surrounding a winding shaft 39. Said winding shaft 39 has a square outer end 40 adapted to be engaged by the square aperture 41 in crank 35 when said crank 35 is swung about hinge 37 into winding position. A gear 42 is mounted on winding shaft 39 and meshes with a gear 43 which in turn meshes with the two pinion gears 34. Said gear 43 is mounted on a shaft 44 which extends through main mechanism plate 22 and is journaled at its other end in cover plate 23. It will be understood by those skilled in the art that rotation of winding shaft 39 will wind the spring motors 30 to store potential energy therein and that said spring motors 30 will give up such energy by rotating pinion gears 34 and shaft 44.

The driving power from the spring motors 30 is conducted to the various other elements of the operaitng mechanism from shaft 44 by a pinion gear 45 which meshes with a small gear 46 mounted upon a shaft 47. A take-up clutch member 48 is mounted on the end of shaft 47 and extends into the magazine chamber for engagement with a complementary clutch member on the film magazine. Shaft 47 also carries a pinion gear 49 in mesh with a pinion gear 50 mounted on a shaft 51 journaled between mechanism plates 22 and 23.

The shutter member of the operating mechanism comprises a conical shutter 52 provided with an opening 53 and mounted upon a shaft 54, which is rotatably mounted at one end upon a portion of the objective socket 19, and which carries at its other end a beveled gear 55 meshing with a beveled gear 56 on a shaft 57 journaled in cover plate 23 and carrying a gear 57' which meshes with the pinion gear 50. Consequently, rotation of pinion gear 50 will cause rotation of the conical shutter 52 which normally covers exposure apertures 21 and 25 but which intermittently uncovers the same when the shutter opening 53 registers with said apertures 21 and 25.

The operating mechanism also includes a film advancing mechanism which comprises a film-engaging member or claw arm 58 having at one end a head 59 and being eccentrically connected at the other end to a disc 60 which is mounted upon a shaft 61 journaled between the mechanism plates 22 and 23. The gear 62 on shaft 61 meshes with gear 50 so that upon rotation thereof the claw arm 58 is reciprocated for intermittent engagement with and advancement of the film in the film magazine within the magazine chamber. Since the shutter member and film advancing mechanism are directly geared together, they operate in a known manner in timed relation so that the film is advanced only during closed positions of the conical shutter.

A control means, also of conventional design, is arranged to engage and stop the aforementioned operating mechanism. Such a control means comprises a single toothed cam 63 mounted on shaft 61 and a blocking member 64 slidably mounted by pins 65 on the main mechanism plate 22 and operated from the exterior of the apparatus by a finger lever 66 mounted on the outer end of a shaft 67 which also carries on its inner end a connector 68 engaging a jaw 69 provided in blocking member 64. A projection 70 extends from blocking member 64 for engagement with the single toothed cam 63. Hence, upon operation of finger lever 66 the shaft 67 and connector 68 are rotated to raise the blocking member 64 along pins 65 and to disengage projection 70 from the single toothed cam 63 so that the spring motors 30 are free to operate the shutter member and film advancing mechanism of the apparatus.

Figure 3:
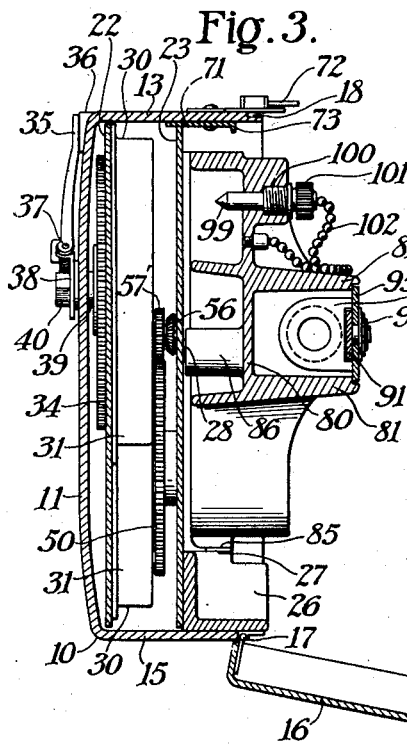
Fig. 3 is a vertical cross section through the assembled photographic apparatus and viewing device.
Figure 4:
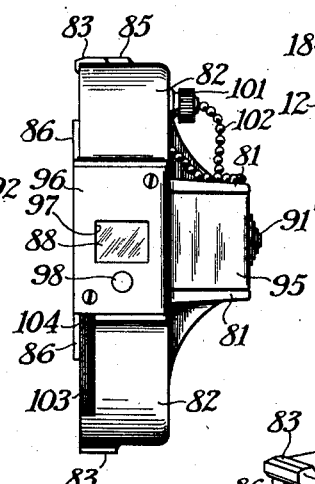
Fig. 4 is a front elevation of the viewing device.
Figure 5:
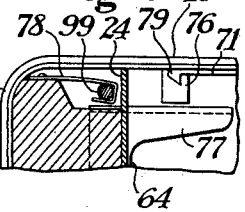
Fig. 5 is a fragmentary elevation of the photographic apparatus particularly showing the manner of releasing the catch means of the apparatus to permit unlocking of the latching means for the cover of the apparatus.

It is quite desirable to provide an interlocking arrangement so that the apparatus cannot be operated when its cover is open or when there is no film magazine or equivalent apparatus in the magazine chamber. To this end the latching means for the cover 16 has a projection for blocking the aforementioned control means and said latching means is normally maintained in unlocking position by a catch means. The latching means comprises a bar 71 slidably mounted along the inner surface of the top lateral wall 13 and operated by an external finger piece 72. Said bar 71 has a longitudinal flange 73, see Figs. 2 and 3, for engaging a hook member 74 on the inside of cover 16 when the finger piece 72, bar 71 and flange 73 are moved into locking position indicated by the dotted lines in Fig. 2. In the unlocking position of the latching means which includes bar 71, finger piece 72 and flange 73, shown by the full lines in Fig. 2, the flange 73 is disengaged from hook member 74 and the cover 16 may be opened. The bar 71 also carries a saddle member 75 for engaging the shutter pin on the film magazine, not shown. The slidable bar 71 is provided at one end with a projection 76 which is in the plane of movement of the blocking member 64 and which, in the position shown in Fig. 2, prevents movement of the control means and blocking member 64 to a disengaging position. The blocking member 64 also carries an arm 77 so that the control means is blocked against operation until the latching means including finger piece 72 and bar 71 are moved to locking position.

The latching means is held in unlocking position by a catch means which includes a U-shaped spring 78 provided with a central opening, not shown, into which a tooth 79 on the bar 71 may extend. Said spring 78 is disengaged by a tapered pin, not shown, on the cover 16. The arrangement of the control means, latching means and catch means is similar to that illustrated and described in Wittel U. S. Patent No. 2,080,-021, issued May 11, 1937, and the entire camera mechanism thus far described is known to the prior art.

Figure 6:
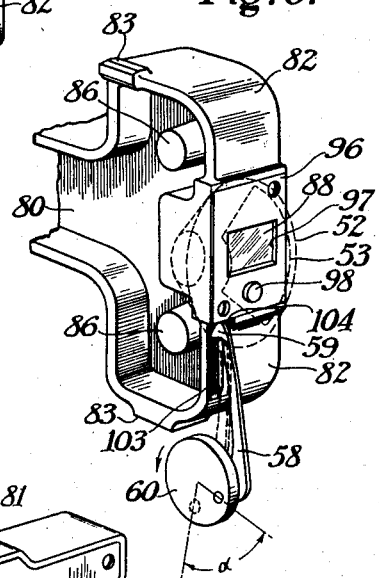
Fig. 6 is a fragmentary perspective of the rear of the viewing device and of the film advancing mechanism of the apparatus for illustrating the blocking action of the abutment on the viewing device.
Figure 7:
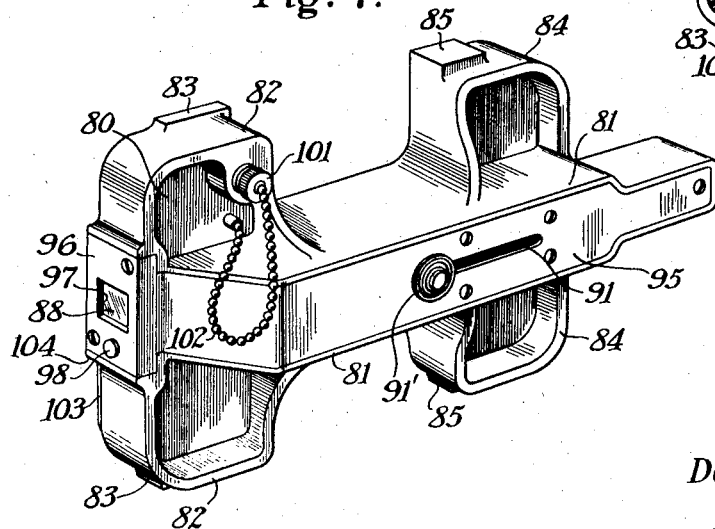
Fig. 7 is a perspective of the complete viewing device from the front.

The viewing device of the invention comprises a base member carrying an optical system equipped with a ground glass screen which upon insertion of the viewing device into the apparatus is located in the focal plane of the objective. The base member of the viewing device comprises a frame member 80 having a central channel formed by the side walls 81. Said frame member 80 also includes a pair of front oppositely extending projections 82 each having a locating surface 83 and also includes a pair of oppositely extending rear projections 84 each having a locating surface 85. The rear surface of the frame member 80 may be hollowed out to reduce the weight of the viewing device but posts 86 extend from the frame member and are located so as to engage the bosses 28 on the cover plate 23, see Figs. 1, 3 and 6.

The optical system of the viewing device includes a positive lens 87 having a ground plano surface 88, a pair of mirrors 89 for directing the image through a displaced path and through a lens 90 which is mounted in a carriage 91, and includes a diaphragm member 92 carrying the front ocular element 93, the rear ocular element 94 being mounted at the rear end of the channel in the base member of the viewing device. A cover plate 95 encloses the channel in the base member and includes a front plate 96 provided with an exposure aperture 97 and a locating member 98. The aforementioned carriage 91 is slidably mounted on cover plate 95 by means of a finger piece 91' so that the lens 90 may be moved between conjugate focal positions. In the rear position of the lens 90 the field covered by the objective of the camera will be indicated at a relatively low magnification, while in the forward position of lens 90 only a portion of the field will be observed but such portion will be at high magnification for greater accuracy in focusing of the objective 20.

The base member of the viewing device is formed so as to equal or correspond to the outline of the film magazine ordinarily used in the apparatus and said base member will be positioned within the apparatus by the locating members which ordinarily position the film magazine. In other words, the locating surfaces on the viewing device are engaged, positioned and supported by the various locating members of the apparatus so that the viewing device is positioned just as accurately as the film magazine is positioned. By the same token the ground glass surface 88 on positive lens 87 is located in the focal plane of the objective 20 just as accurately as the film in the magazine is located in that focal plane.

However, in the ordinary photographic apparatus of the motion picture type the shutter is in closed position when the control means becomes operative to stop the apparatus. The viewing device of this invention is particularly adapted to remove the obstacles to such stopping of the shutter in closed position so that the spring motor of the apparatus can act to open the shutter.

Accordingly, a releasing member is detachably mounted in the viewing device and specifically comprises a tapered pin 99, a threaded portion 100 and a knurled portion 101. A flexible chain 102 is fastened at one end to knurled portion 101 and at the other end to the frame member 80. A portion of the front projection 82 is bored and threaded to receive the pin 99 and threaded portion 100 of the releasing member. Said releasing member may be detached from the frame member of the viewing device and inserted between the legs of the U-shaped spring 78 for movement of the spring to disengage the tooth 79 on bar 71. At the same time finger piece 72 may be operated to move the latching means to locking position. Since the viewing device occupies the magazine chamber and does not permit complete closure of the cover 16, some auxiliary arrangement such as just described must be provided for the disengagement of the catch means to permit movement of the latching means to locking position so that the control means for the operating mechanism may be disengaged.

In addition to the release of the control means there must also be some arrangement for blocking the operating mechanism with the shutter member in open position. According to the present invention, the lower front projection 82 of the base member is provided with a recess 103 which is opposite the claw arm 58 of the film advancing mechanism and which terminates in an abutment 104 located and arranged so as to block the claw head 59 and to stop the operating mechanism when the opening 53 of the shutter 52 is in registry with the exposure apertures 21 and 25 in the objective socket 19 and front plate 24, respectively. The relative positions of the claw head 59 and the abutment 104 during the normal stopped position of the apparatus are indicated by the dotted lines in Fig. 6, while the angular movement of the disc 60 through the angle alpha and linear movement of the claw arm 58 with claw head 59 abutting against the abutment 104 is shown by the full lines in Fig. 6. As a result, after insertion of the viewing device in the magazine chamber and release of the catch means to permit movement of the latching means to locking position and disengagement of the control means, the spring motors operate through the intervening gear trains to move the film advancing mechanism and claw arm 58 until the claw head 59 abuts against abutment 104 at which time the shutter opening 53 is opposite the exposure apertures 21 and 25. This makes the photographic objective 20 available so that by sighting through the rear ocular 94 the field covered by the objective 20 is indicated when the lens 90 is in the rearward position and a portion of the field may be observed at greater magnification when the lens and its carriage 91 are moved to the forward position. In such forward position the objective 20 may be focused with simultaneous observation of the image on the ground glass surface 88. By reason of such increased magnification this focusing operation may be conducted very accurately.

As previously pointed out, the present disclosure is to be considered only in an illustrative sense and the scope of the invention is defined in the appended claims.

Having now particularly described my invention what I desire to secure by Letters Patent of the United States and what I claim is:

1. In a photographic apparatus, the combination with a casing carrying an objective and provided with a chamber for a film carrier, a shutter member movable into a closed position and into an open position respectively to intercept and to permit the passage of light from said objective to said chamber, an operating mechanism connected to said shutter member and including a prime mover for driving the same, and a control means for engaging said operating mechanism and for stopping the same with said shutter member in closed position, of a viewing device including an optical system and adapted to be inserted into said chamber with said optical system in operative relation to said objective, and having a portion arranged to engage said operating mechanism, upon disengagement of said control means and movement of the shutter by said prime mover, and located to stop said operating mechanism with said shutter in its open position.

2. In a photographic apparatus, the combination with a casing carrying an objective and provided with a chamber for a film carrier, a shutter member movable into a closed position and into an open position respectively to intercept and to permit the passage of light from said objective to said chamber, an operating mechanism including a film engaging member operatively connected in definite relation to said shutter member and for extending into said chamber, a spring motor for driving said film engaging and shutter members, and a control means for engaging said operating mechanism and for stopping the same with said shutter member in closed position, of a viewing device including an optical system and adapted to be inserted into said chamber with said optical system in operative relation to said objective, and having a portion arranged to engage said film engaging member, when said control means is disengaged for movement of said film engaging member and said shutter by the spring motor, and located to stop said film engaging member with said shutter in its open position.

3. In a photographic apparatus, the combination with a casing carrying an objective and provided with a magazine chamber, a cover for said casing, a shutter member movable into closed and open positions, an operating mechanism connected to said shutter member and including a spring motor for driving the same, a control means arranged to engage said operating mechanism and to stop the same with said shutter member in closed position, a latching means movable to locking and unlocking positions, for fastening in said locking position said cover to said casing and including a portion which in unlocking position of said latching means engages and blocks said control means in engaged position, and a catch means located and arranged releasably to engage and hold said latching means in unlocking position, of a viewing device comprising a base member adapted to be inserted into said chamber, an optical system on said base member for co-operating with said objective when said device is inserted into said chamber, and a releasing member mounted on said base member and for engaging and releasing said catch means for permitting movement of said latching means to locking position and disengagement of said control means.

4. In a photographic apparatus, the combination with a casing carrying an objective and provided with a chamber for a film carrier, a cover for said casing, a shutter member movable into closed and open positions, an operating mechanism connected to said shutter member and including a spring motor for driving the same, a control means arranged to engage said operating mechanism and to stop the same with said shutter member in closed position, a latching means movable to locking and unlocking positions, for fastening said cover to said casing in said locking position and including a portion which in unlocking position of said latching means engages and blocks said control means in engaged position, and a catch means located and arranged releasably to engage and hold said latching means in unlocking position, of a viewing device comprising a base member adapted to be inserted into said chamber, an optical system on said base member and in operative relation to said objective when said base member is inserted into said chamber, a releasing member mounted on said base member and movable to engage and release said catch means for permitting movement of said latching means to locking position and disengagement of said control means, and a portion on said base member arranged to engage said operating mechanism upon disengagement of said control means and located to stop said operating mechanism with said shutter in its open position.

DONALD L. WOOD.